(12) United States Patent
Ishikawa et al.

(10) Patent No.: US 8,814,444 B2
(45) Date of Patent: Aug. 26, 2014

(54) OPTICAL CONNECTOR

(75) Inventors: Takaaki Ishikawa, Sakura (JP); Kunihiko Fujiwara, Sakura (JP)

(73) Assignee: Fujikura Ltd., Tokyo (JP)

( * ) Notice: Subject to any disclaimer, the term of this patent is extended or adjusted under 35 U.S.C. 154(b) by 490 days.

(21) Appl. No.: 12/119,810

(22) Filed: May 13, 2008

(65) Prior Publication Data

US 2009/0285534 A1 Nov. 19, 2009

(51) Int. Cl.
*G02B 6/38* (2006.01)
*G02B 6/36* (2006.01)

(52) U.S. Cl.
USPC .................................. 385/78; 385/60; 385/72

(58) Field of Classification Search
USPC ................................ 385/60, 72, 78
See application file for complete search history.

(56) References Cited

U.S. PATENT DOCUMENTS

| | | | | |
|---|---|---|---|---|
| 4,448,478 A | * | 5/1984 | Matthews et al. | 385/59 |
| 5,692,080 A | * | 11/1997 | Lu | 385/60 |
| 7,284,912 B2 | * | 10/2007 | Suzuki et al. | 385/75 |
| 7,481,585 B2 | * | 1/2009 | Scadden et al. | 385/75 |

FOREIGN PATENT DOCUMENTS

| | | |
|---|---|---|
| JP | 2000-292652 | 10/2000 |
| JP | 2002-148485 | 5/2002 |

* cited by examiner

*Primary Examiner* — Michelle R Connelly
*Assistant Examiner* — John M Bedtelyon
(74) *Attorney, Agent, or Firm* — Sughrue Mion, PLLC

(57) ABSTRACT

An optical connector includes a connector housing; an optical ferrule that is housed in the connector housing; a coil spring that is housed in the connector housing and impresses the optical ferrule in a forward direction; and a spring pressing portion that is attached to an rear end of the connector housing, has an optical fiber inserting through-hole and a spring reception portion, and receives a reaction force of the coil spring. The spring pressing portion is divided into two half bodies. Since the spring pressing portion is divided into two parts, at the time of assembly of the optical connector, the optical ferrule is attached to the optical fibers and is terminated, and then the optical fibers can be covered with the spring pressing portion. At the time of the terminating operation, since there is no spring pressing portion that causes interference in the operation, it is easy to perform the terminating operation of the optical ferrule.

8 Claims, 10 Drawing Sheets

OPTICAL CONNECTOR

BACKGROUND OF THE INVENTION

1. Field of the Invention

The present invention relates to an optical connector including a coil spring that impresses an optical ferrule and a spring pressing portion that receives a reaction force of the coil spring, and more particularly, to the spring pressing portion.

2. Description of Related Art

As an optical connector including a coil spring that impresses an optical ferrule and a spring pressing portion that receives a reaction force of the coil spring, there is an F13-type multi-core optical fiber connector described in JIS C5982, which is a so-called MPO optical connector. FIGS. 10A to 12 show this kind of conventional optical connector (MPO optical connector) 51.

The optical connector 51 has the following basic structure (see Japanese Patent Application, Publication No. 2002-148485). In a connector housing 52, an optical ferrule 53 obtained by inserting and fixing a front end of optical fibers and then performing a terminating work, and a coil spring 54 that impresses the optical ferrule 53 in a forward are housed, and a spring pressing portion 55 is attached to a rear end side of the connector housing 52. The spring pressing portion 55 receives a reaction force of the coil spring 54. A coupling 56 for attachment to and detachment from an adaptor 50 that is a connector coupling portion is mounted on an outer periphery of the connector housing 52 together with a coupling spring 57, and a rubber boot 59 for protecting a periphery of a connector opening portion of an optical fiber cord (optical fiber tape in the shown example) 58 is attached to a rear portion of the spring pressing portion 55. Reference numeral 58a denotes an optical fiber portion (a part of forming a tape shape in which plural lines of optical fibers come into close contact with each other) from which a coating of the optical fiber cord 58 is removed, and reference numeral 58b is a coating portion (cord portion) of the optical fiber cord 58. Each of the optical fibers is obtained by performing a first coating on a bare fiber, for example, an outer diameter thereof is 0.25 mm.

When the optical connector 51 is connected to the adaptor 50 shown in FIG. 12, an opposite optical connector (not shown) connected to the adaptor 50 from the opposite side thereof and the optical ferrule 53 face each other, thereby optically connecting the optical fibers to each other.

As shown in a perspective view of FIG. 11, the spring pressing portion 55 is a resin molding article having an optical fiber inserting through-hole 55a for passing the optical fibers therethrough, a spring reception portion 55b that receives a reaction force of the coil spring 54, and an engagement claw 55c that engages with an engagement hole 52a of the connector housing 52. As shown in the same figure, the conventional spring pressing portion 55 is an integrally molded article.

In assembly of the optical connector 51, the optical ferrule 53 is attached to the front end of the optical fibers to grind the end face thereof. At that time, it is necessary to pass the optical fibers into a plurality of components. That is, it is necessary to pass the optical fibers into the rubber boot 59, the spring pressing portion 55, and the coil spring 54.

Among these components, particularly, the optical fiber inserting through-hole 55a of the spring pressing portion 55 has an inner diameter capable of passing the optical fiber portion 58a of the optical fiber cord 58, and has no room for passing the coating portion (cord portion) 58b. In addition, there is room in the sectional view of FIG. 10A shown by the section of the cord along the widthwise direction, but there is no room in the thickness direction (thickness direction of the optical fiber tape, vertical direction in FIG. 10B) of the cord.

Meanwhile, since a length of the optical fiber portion 58a of the cord is regulated to a predetermined length or less, it is difficult to secure sufficient room length of the optical fiber portion 58a in the optical connector 51. Accordingly, the spring 54 and the spring pressing portion 55 covering the optical fiber portion 58a are disposed close to each other because it is difficult to sufficiently detach them from the rear end face of the optical ferrule 53.

As a result, at the time of the terminating an operation of the optical ferrule 53, there is a problem that the spring pressing portion 55 covering the optical fiber portion 58a causes interference in the operation. In addition, although the spring 54 similarly causes interference in the operation, there is no interference such as the case of the spring pressing portion 55 because the spring 54 is made of expandable, contractible, and flexible materials. Herein, the terminating the operation of the optical ferrule indicates an operation of attaching the optical ferrule to the front end of the optical fibers and grinding the section thereof.

SUMMARY OF THE INVENTION

The invention has been made to solve the aforementioned conventional problem, and an object of the invention is to provide an optical connector including a coil spring that impresses an optical ferrule and a spring pressing portion that receives a reaction force of the coil spring, in which a terminating operation of the optical ferrule can be easily carried out at the time of assembly of the optical connector.

According to the invention, there is provided an optical connector including: a connector housing; an optical ferrule that is housed in the connector housing; a coil spring that is housed in the connector housing and impresses the optical ferrule in a forward direction; and a spring pressing portion that is attached to a rear end of the connector housing, has an optical fiber inserting through-hole and a spring reception portion, and receives a reaction force of the coil spring, wherein the spring pressing portion is formed of two half bodies that form the optical fiber inserting through-hole and the spring reception portion by combining these two half bodies.

In the optical connector, it is preferable that an engagement protrusion is formed on one junction face of the two half bodies, and an engagement recession portion that engages with the engagement protrusion is formed on the other junction face.

In addition, optical fibers extending from the optical ferrule may be inserted into the coil spring. Alternatively, a pair of coil springs may be provided, and the pair of coil springs may be disposed on both sides of the optical fibers extending from the optical ferrule, in a widthwise direction of the optical connector.

According to the invention, the spring pressing portion is not a one-body molding article, but is formed of two bodies that form an optical fiber inserting through-hole and a spring reception portion at the time of assembly. Accordingly, the optical ferrule is attached to the front end of the optical fibers, and then the optical fibers can be covered with the spring pressing portion. Therefore, the terminating operation of the optical ferrule can be performed without the spring pressing portion that causes interference, and thus it is easy to perform the terminating operation of the optical ferrule.

In the case that the engagement protrusion of the junction face of one half-body is engaged with the engagement recession portion of the junction face of the other half-body and both are coupled with each other, the assembly operation of the spring pressing portion formed of two half bodies is very easy.

DETAILED DESCRIPTION OF THE INVENTION

Figure 1:
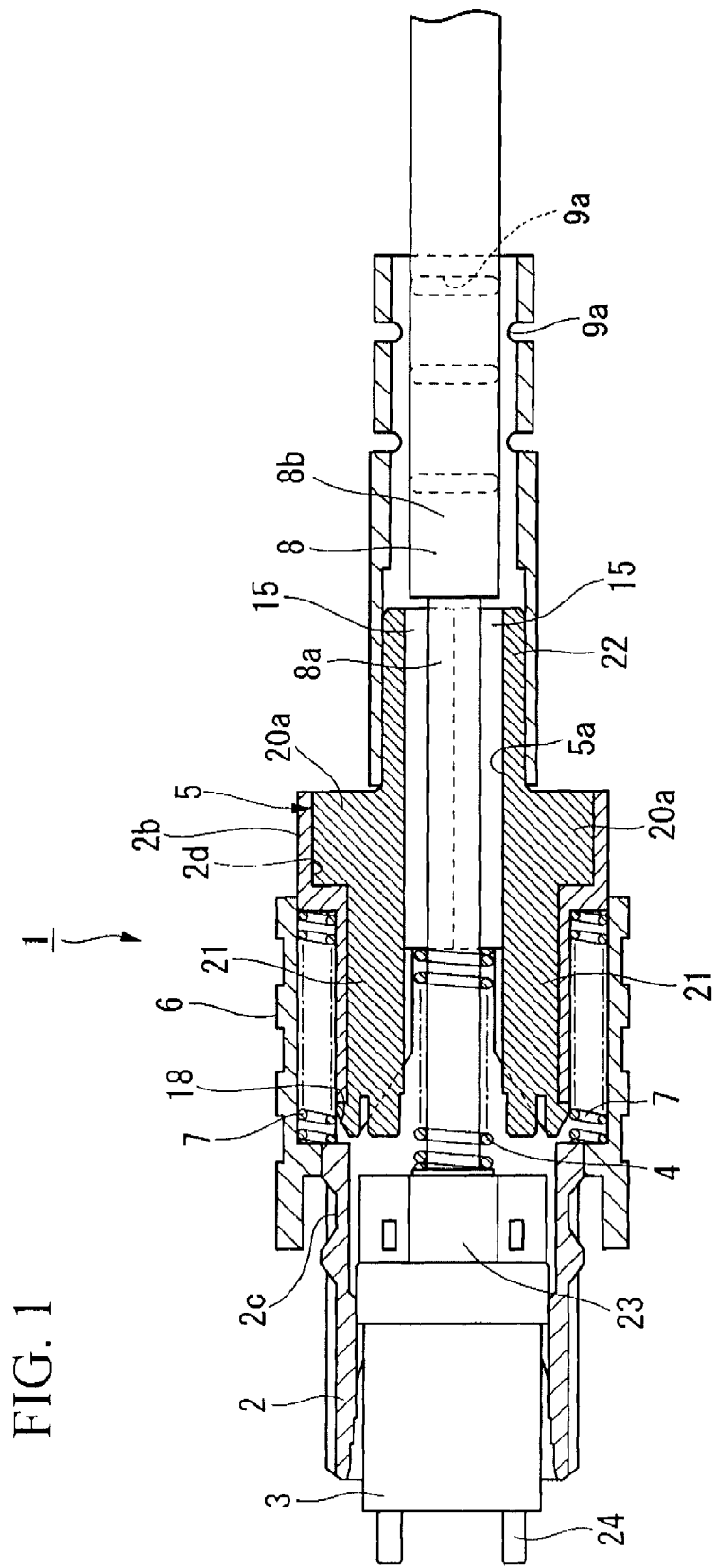
FIG. 1 is a sectional plan view of an optical connector according to a first embodiment of the invention.

Hereinafter, the invention will be described with reference to FIGS. 1 to 9.
First Embodiment FIG. 1 is a sectional view of an optical connector 1 according to a first embodiment of the invention. The optical connector 1 substantially corresponds to the F13-type multi-core optical fiber connector prescribed in JIS C5982, which is a so-called MPO optical connector, and has the following basic structure.

In a connector housing 2, an optical ferrule 3 obtained by inserting and fixing a front end portion of optical fibers and then performing a terminating operation, and a coil spring 4 that impresses the optical ferrule 3 in a forward direction (connection direction) are housed, a spring pressing portion (referred to as stop ring) 5 is attached to a rear end side of the connector housing 2, and the spring pressing portion 5 receives a reaction force of the coil spring 4. In an outer periphery of the connector housing 2, a coupling 6 for attachment to and detachment from an adaptor (the same as reference numeral 50 in FIG. 12) that is a connector coupling portion is mounted together with a pair of coupling springs 7, and a rubber boot 9 for protecting the vicinity of an connector opening portion of an optical fiber cord (optical fiber tape in the shown example) 8 is attached to the rear portion of the spring pressing portion 5. Reference numeral 8a denotes an optical fiber portion (a part in which plural line of optical fibers come into close contact with each other to form a tape shape) from which a coating of the optical fiber cord 8 is removed, and reference numeral 8b denotes a coating portion (cord portion) of the optical fiber cord 8.

Figure 12:
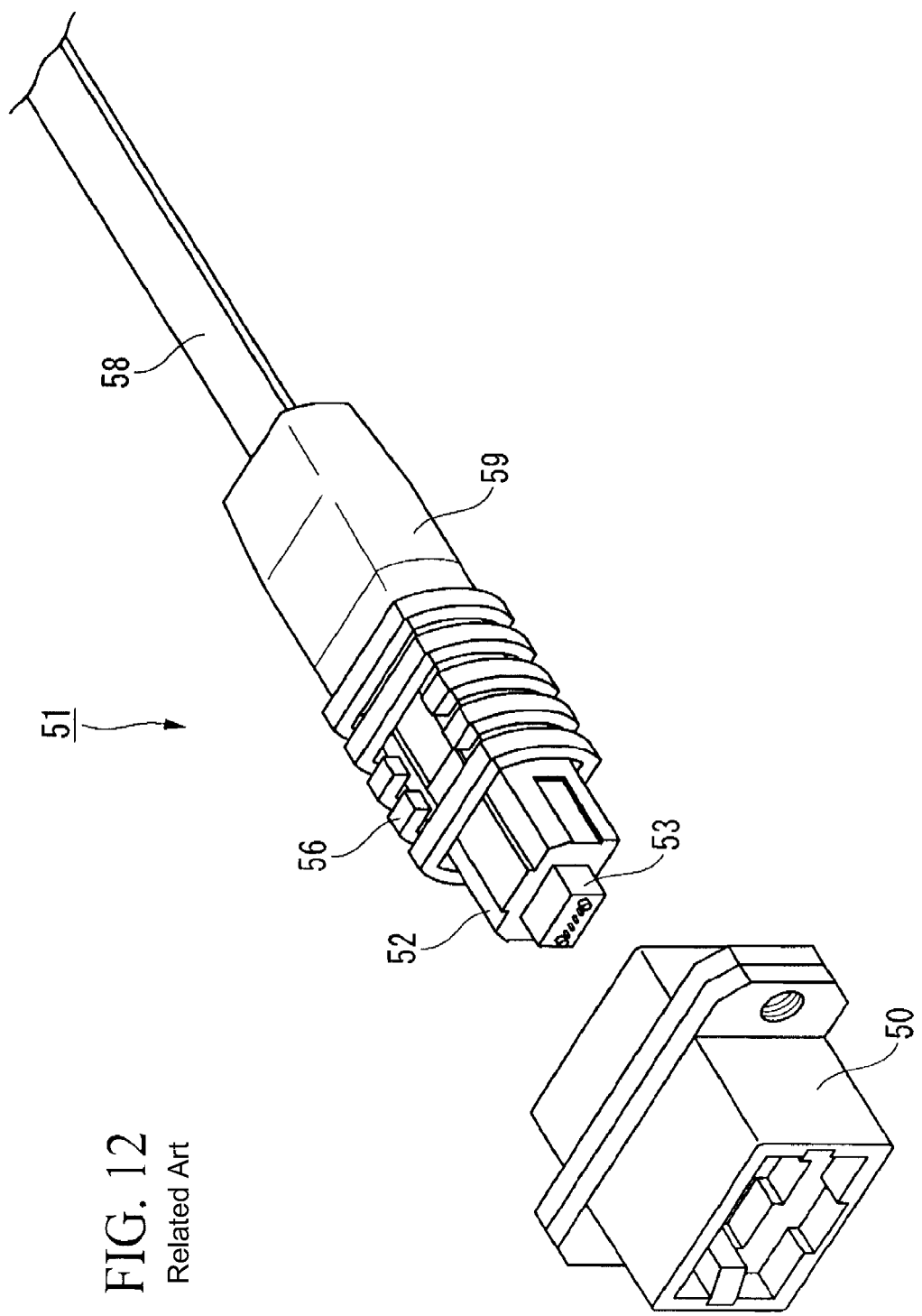
FIG. 12 is a perspective view illustrating appearance of the conventional optical together with an adaptor.

When the optical connector 1 is connected to the same adaptor as the adaptor 50 shown in FIG. 12, the coupling 6 retreats, the engagement recession portion 2c of the connector housing 2 engages with the engagement claw close to the adaptor, the optical connector 1 is mounted on the adaptor, the opposite optical connector connected to the adaptor from the opposite side and the optical ferrule 3 face to each other, and thus the optical fibers are optically connected each other.

Figure 2:
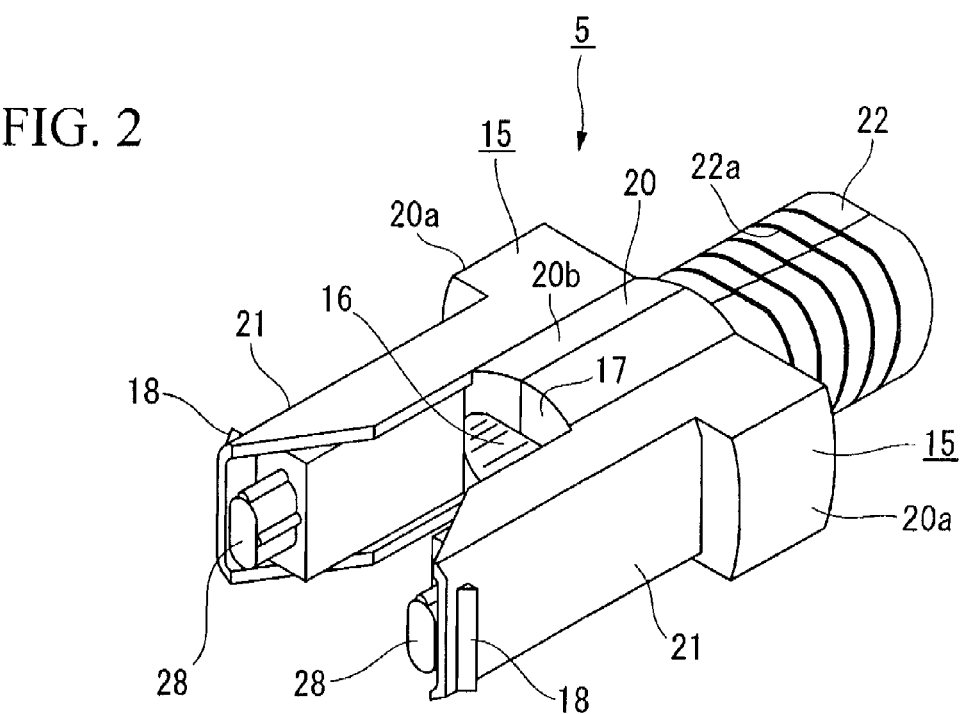
FIG. 2 is a perspective view of a spring pressing portion of the optical connector.
Figure 3:
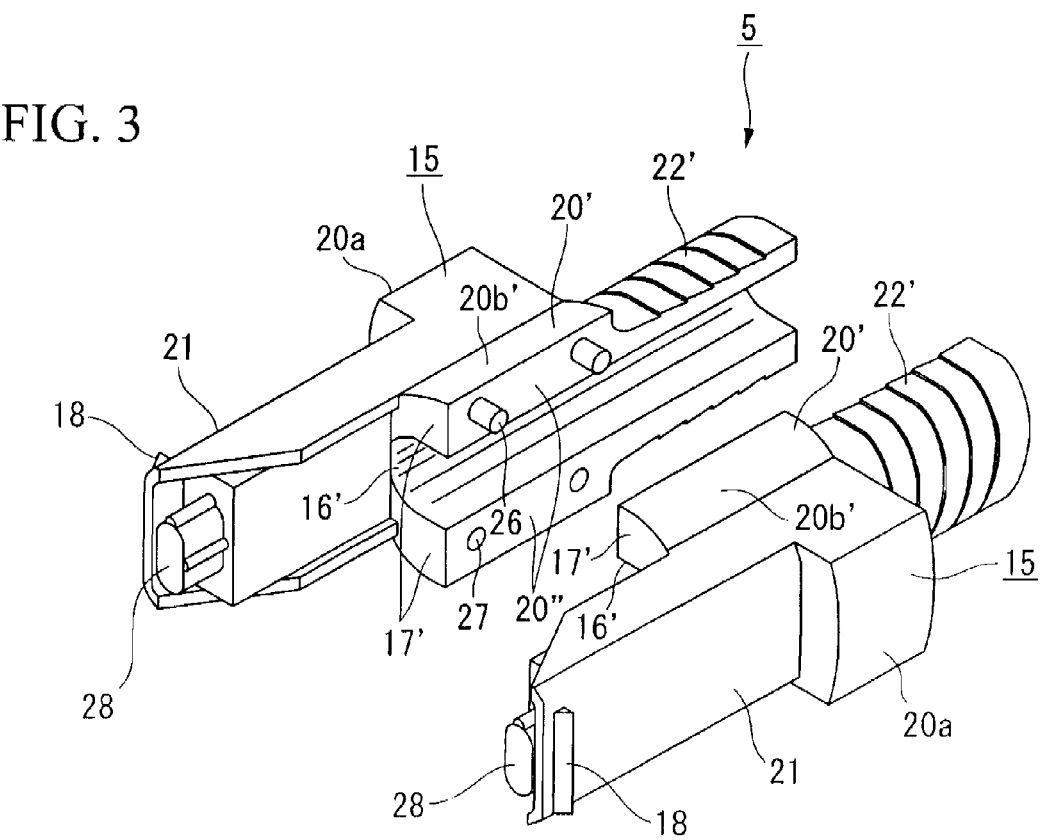
FIG. 3 is an exploded view of the spring pressing portion shown in FIG. 2.
Figure 4:
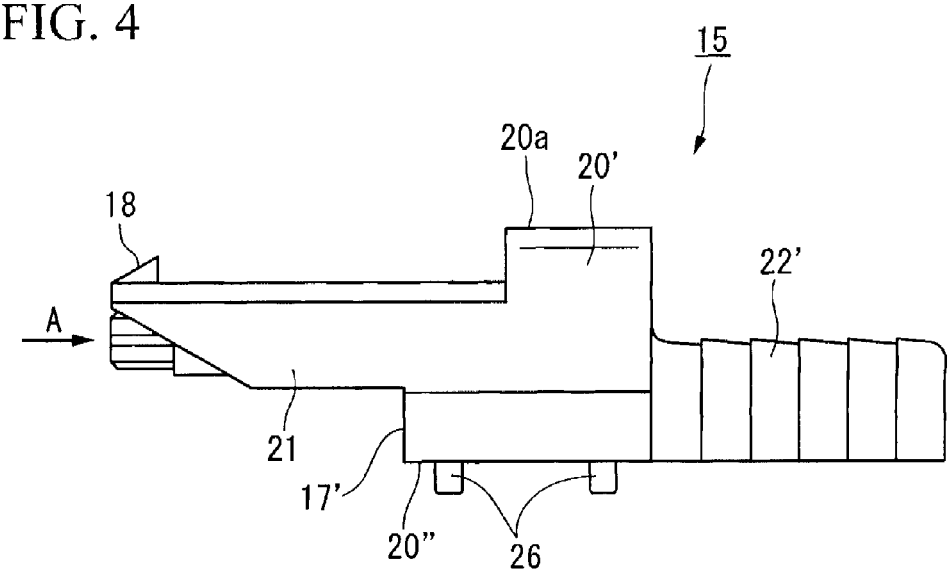
FIG. 4 is a side view of a half body of the spring pressing portion.
Figure 5:
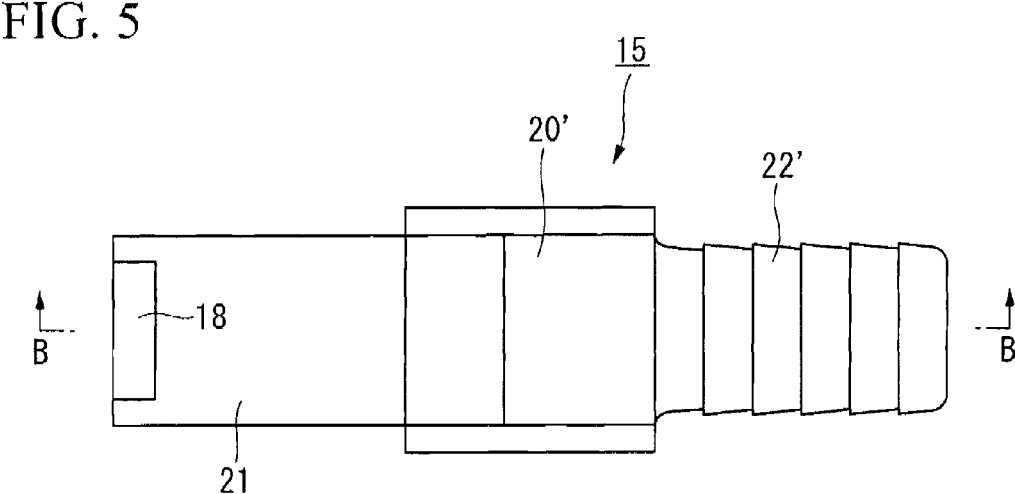
FIG. 5 is a plan view of FIG. 4.
Figure 6:
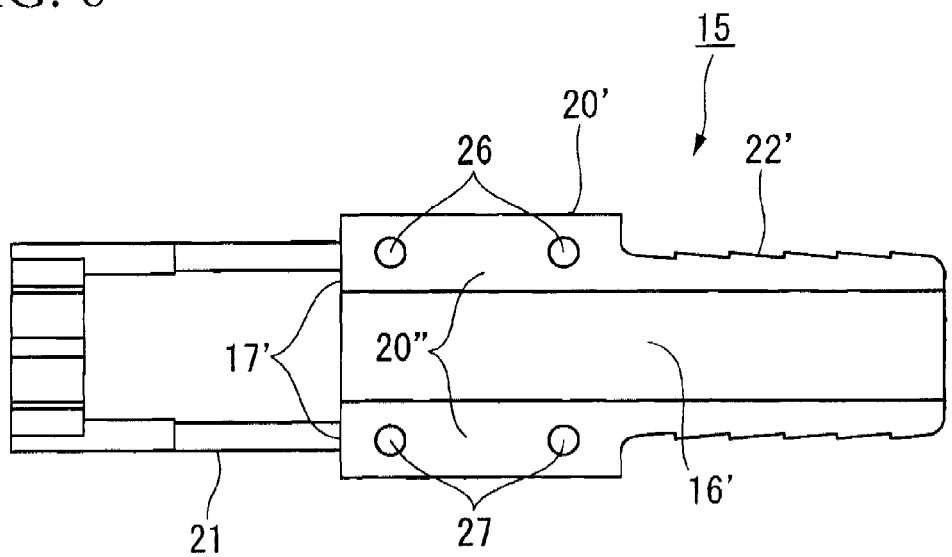
FIG. 6 is a bottom view of FIG. 4.

The structure of the spring pressing portion 5 will be described in detail with reference to FIGS. 2 to 8. In the following description, a front side denotes a side where a connection end face of the optical ferrule 3 exists. The spring pressing portion 5 is divided into two half bodies 15. The half bodies 15 are, for example, resin molding articles such as PBT (polybutylene terephthalate). When the two half bodies 15 come into contact with each other by facing each other, they form one body as shown in FIG. 2, thereby forming a structure of the spring pressing portion. That is, the spring pressing portion 5 formed by combining the two bodies 15 includes an optical fiber inserting through-hole 16 through which optical fibers pass, a spring reception portion 17 that receives a reaction force of the coil spring 4, and a pair of engagement claws 18 that engage with an engagement hole 2a of the connector housing 2. The engagement claws 18 are formed on outside faces of a pair of arm portions 21 extending forwardly from a base portion 20 of the spring pressing portion 5. On the rear side of the base portion 20, a cylindrical rubber boot attachment portion 22 having a oval shape in the figure as viewed in a direction indicated by the arrow A in FIG. 4 is formed, the inner portions of the base portion 20 and the rubber boot attachment portion 22 form the optical fiber inserting through hole 16. The base portion 20 has protrusion portions 20a on both sides in the widthwise direction (direction in which one pair of arm portions 21 are opposed to each other) of the connector, and the protrusion portions 20a are inserted to the inside of a stair-shaped diameter expansion portion 2d formed at the rear end portion of the connector housing 2. The protrusion portions 20a are fixed to the rear end side of the connector housing 2 by engagement with the stair-shaped diameter expansion portion 2d and engagement between the engagement claws 18 and the engagement holes 2a. The front end face of the base portion 20 forms the spring reception portion 17. An outer periphery of a center portion 20b of the base portion 20 is formed of a curved face. On the outer peripheral face of the rubber boot attachment portion 22, a plurality of circumferential groove 22a for preventing the rubber boot 9 from being peeled off is formed in a volute joint type. Meanwhile, the rubber boot 9 is thinner than a general rubber boot, and has a thin long hole 9a extending in a circumferential direction to be flexibly bent. Reference numeral 23 denotes a pin clamp, which holds a guide pin 24 attached to the rear end portion of the optical ferrule 3.

Figure 7:
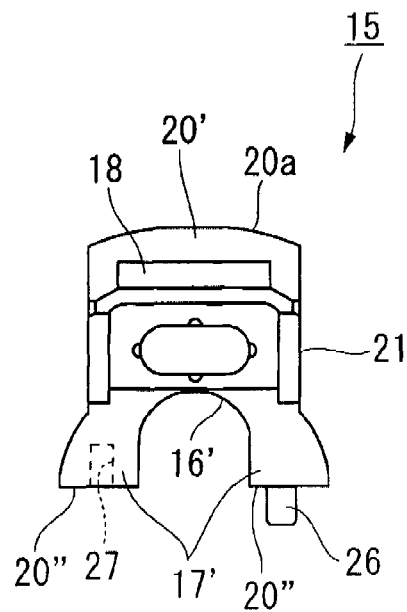
FIG. 7 is a view from the direction indicated by the arrow A in FIG. 4.
Figure 8:
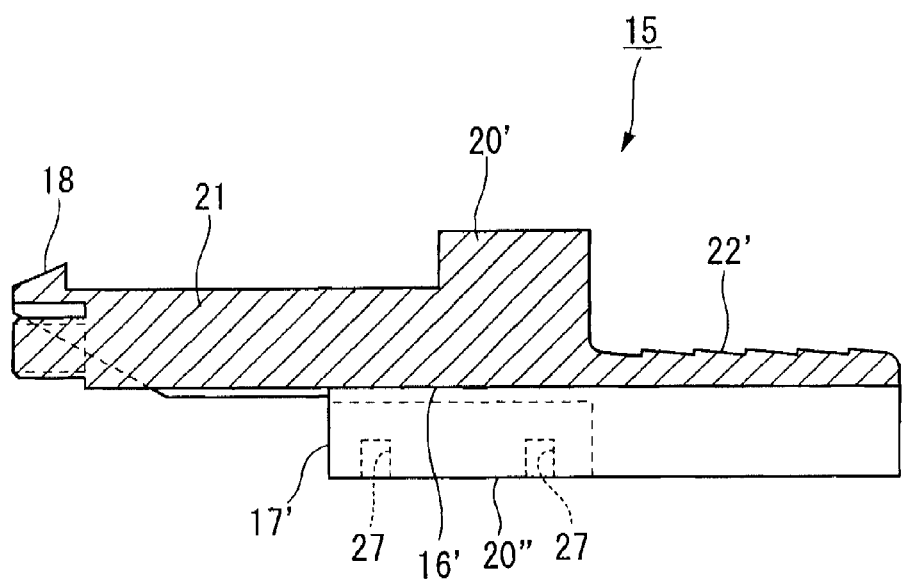
FIG. 8 is a sectional view of FIG. 5 taken along the line B-B.

In the above description, the structure of the spring pressing portion 5 has been described in the state where the two half bodies 15 have been assembled, but each of the half bodies 15 is one side portion of the spring pressing portion having such a structure at the time of assembly. That is, each of the half bodies 15 has a one-side portion 20' of the base 20, a one-side protrusion portion 20a, a one-side portion 20b' of the center portion 20b, a one-side portion 17' of the spring reception portion 17, a one-side arm portion 21 having one engagement claw 18, and a one-side portion 22' of the rubber boot attachment portion 22. In addition, on the one-side portion 20' of the base portion 20 and the one-side portion 22' of the rubber boot attachment portion 22, a half-oval concave portion 16' which provides the one-side portion of the optical fiber inserting through-hole 16 is formed. As shown in FIG. 7, on a junction face 20" of one one-side portion 20', two engagement protrusions 26 and two engagement holes 27 are formed with the half-oval concave portion 16' therebetween.

On the contrary, on a junction face 20" of the other one-side portion 20', two engagement protrusions 26 and two engagement holes 27 are formed with the half-oval concave portion 16' therebetween. One-side engagement protrusions 26 and 26 are opposed to the other-side engagement holes 27 and 27.

When these half bodies 15 come into contact with each other by facing each other, the engagement protrusion 26 of one half body 15 is inserted into the engagement hole 27 of the other half body 15, and both half bodies 15 are combined with each other and fixed. In addition, adhesive may be applied to the junction face 20" to more strongly fix the half bodies 15. The junction face 20" may be formed of a simple flat face having no structural junction means such as the engagement protrusion 26 and the engagement hole 27 to simply adhere them using adhesive.

A sectional shape (shape as viewed from the front end side or base end side) of the coil spring 4 may be appropriately selected from a circular or oval shape, and the shape of the spring reception portion 17 may be modified according to this sectional shape.

When the optical connector 1 is assembled, the optical ferrule 3 is attached to the front end of the optical fibers in which the optical fibers are previously pass through the inside of the rubber boot 9 and the coil spring 4. In the past, it was necessary to pass the optical fibers through the spring pressing portion. However, in the present invention, as described later, since the optical ferrule 3 is terminated and the spring pressing portion 5 covers the optical fibers, the above step is unnecessary.

Next, the end face of the optical ferrule 3 is grinded. In the terminating operation until the optical ferrule 3 is attached to the optical fibers and the end face grinding of the optical ferrule 3 is performed, the optical fibers are not covered by the spring pressing portion 5. Accordingly, it is very easy to perform the terminating operation of the optical ferrule. That is, the optical fiber inserting through-hole 16 of the spring pressing portion has an inner diameter large enough to pass the optical fiber portion 8a of the optical fiber cord 8, and has no room to pass the coating portion (cord portion) 8b. Meanwhile, since the length of the optical fiber portion 8a of the cord is regulated to a predetermined length or less, it is difficult to secure a sufficient margin length of the optical fiber portion 58a in the optical connector 51. Accordingly, when the spring pressing portion covers the optical fiber portion 8a as it was performed in the past, the spring pressing portion cannot be sufficiently detached from the rear end face of the optical ferrule 3 and thus is located at an adjacent position. As a result, at the time of the terminating operation of the optical ferrule 3, the spring pressing portion passing the optical fiber portion 8a causes interference in the operation.

However, according to the above-described optical connector 1, since the spring pressing portion 5 is divided into two parts, as described above, the optical ferrule is attached to the front end of the optical fibers and the optical ferrule is terminated, and then the optical fibers (optical fiber portion 8a) can be covered by the spring pressing portion 5. Therefore, the terminating operation of the optical ferrule can be performed without the spring pressing portion that causes interference, and thus it is easy to perform the terminating operation of the optical ferrule. In addition, although the spring 4 similarly causes interference in the operation, the spring 4 is expandable, contractible, and flexible, and thus does not cause a large amount of interference.

Next, the spring pressing portion 5 is mounted on the coil spring 4 on the optical fibers. In this case, the spring pressing portion 5 is divided into two half bodies 15. Accordingly, when the two half bodies 15 come into contact with each other by facing each other so as to cover the optical fibers and the coil spring 4, the spring pressing portion 5 is mounted on the optical fibers. At the time of contact, the engagement protrusion 26 of one half body 15 is connected to the engagement hole 27 of the other half body 15 and thus both come into strong contact with each other. The contact operation by the engagement protrusion 26 and the engagement hole 27 is very easy and excellent in workability. Next, the optical ferrule 3 is housed in the front portion of the connector housing 2, the engagement claw 18 of the front end of the spring pressing portion 5 engages with the engagement hole 2a of the connector housing 2, and the protrusion portions 20a on both sides of the base portion 20 engage with the stair-shaped diameter expansion portion 2d of the connector housing 2, thereby attaching the spring pressing portion 5 to the rear portion of the connector housing 2. Next, the rubber boot attachment portion 22 of the rear portion of the spring pressing portion 5 is covered with the rubber boot 9. Consequently, the assembly of the optical connector 1 is completed.

Second Embodiment

Figure 9:
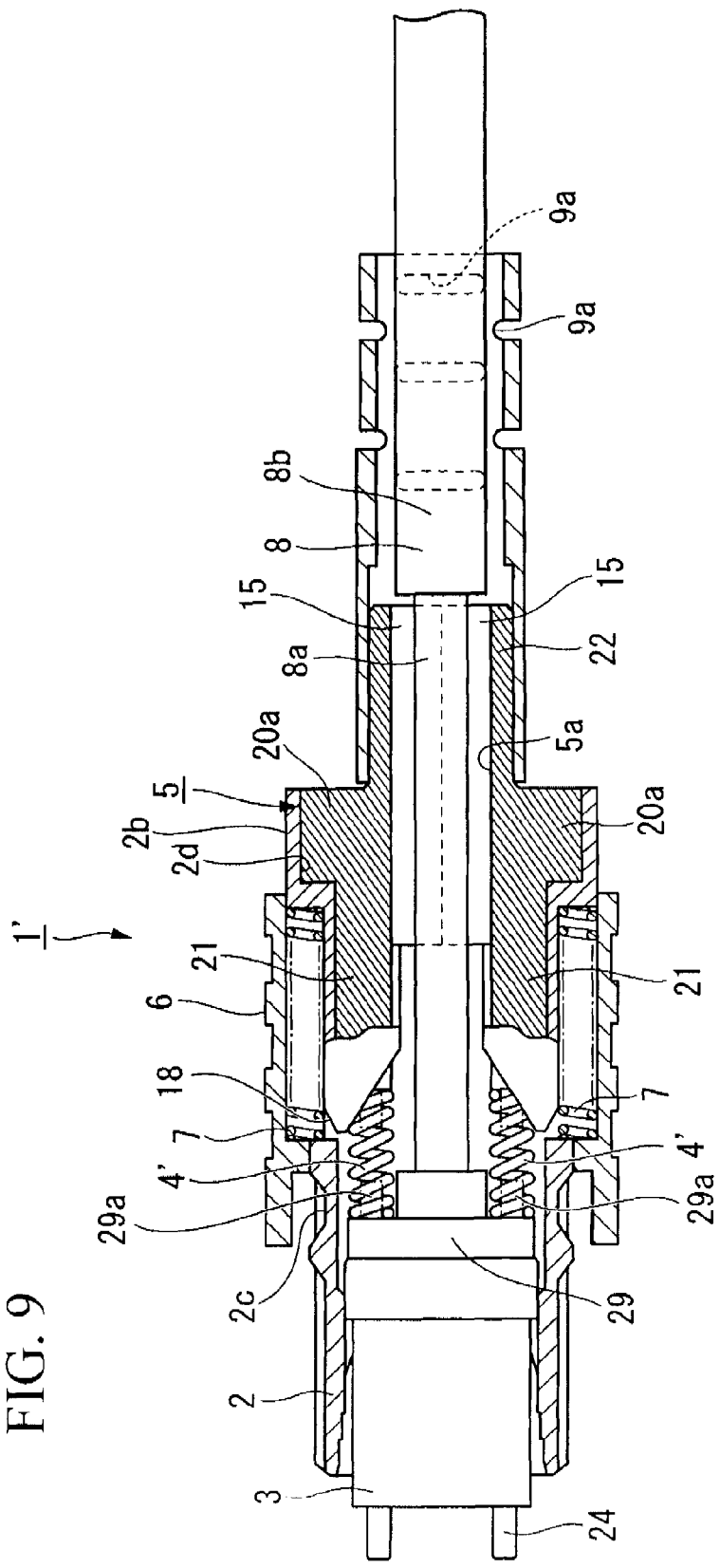
FIG. 9 is a sectional plan view of an optical connector according to a second embodiment of the invention.
Figure 10A:
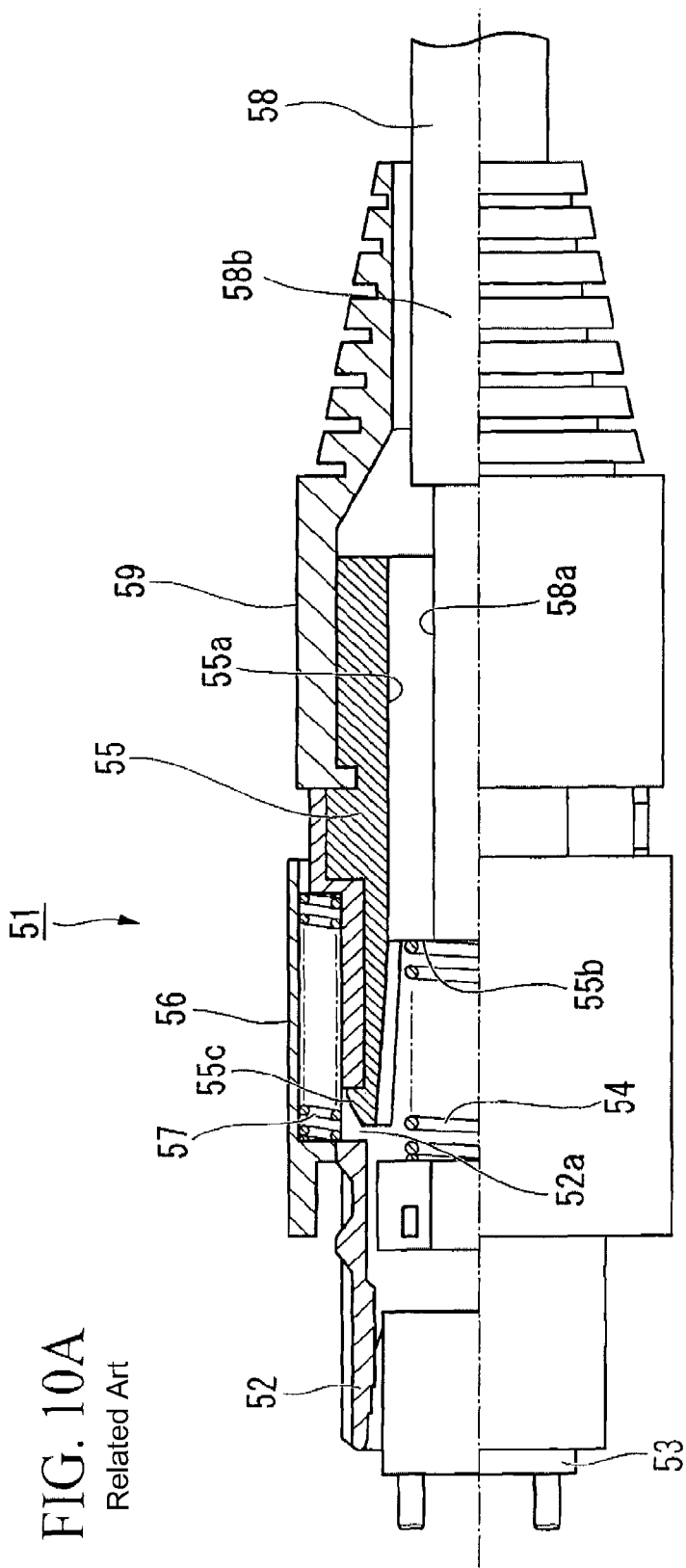
FIG. 10A is a plan view of a conventional optical connector in which one side thereof is illustrated in section.
Figure 10B:
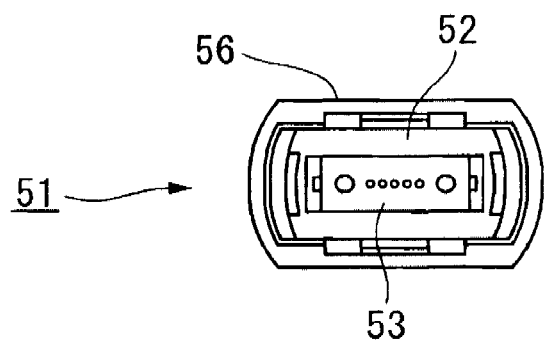
FIG. 10B is a view illustrating a section of the optical connector shown in FIG. 10A.
Figure 11:
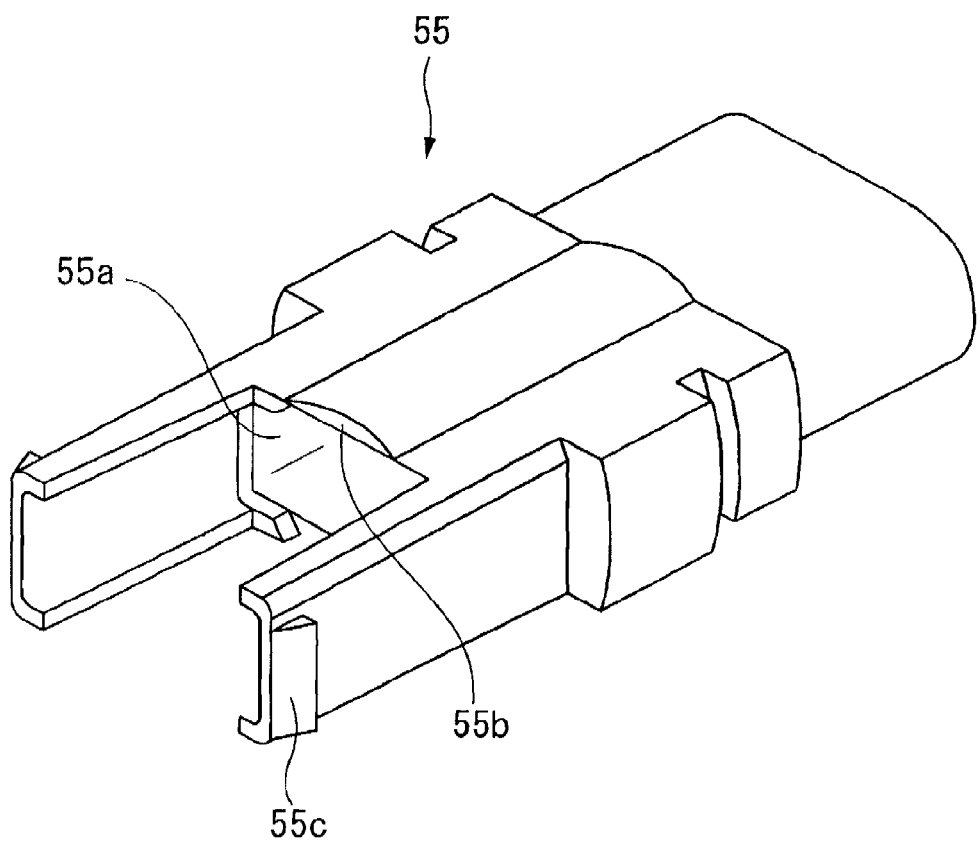
FIG. 11 is a perspective view of a spring pressing portion of the optical connector shown in FIG. 10.

FIG. 9 is a sectional plan view of an optical connector 1' according to a second embodiment of the invention. In the optical connector 1', the same reference numeral as that of the first embodiment is given to a member having the same configuration as that of the optical connector 1 of the first embodiment, and the description thereof is omitted.

In the optical connector 1', the optical ferrule is impressed by a pair of coil springs 4' disposed on both sides of the optical fibers (optical fiber portion 8a) in the widthwise direction of the connector, instead of the coil spring 4 of the optical connector 1 according to the first embodiment. The coil springs 4' are disposed between the front end face of a pair of arm portions 21 of the spring pressing portion 5 and the rear end face of the spring receiver 29 supported by the optical ferrule 3 from the rear thereof, and applies an elastic force in a direction of separating the front end face and the rear end face, thereby urging the optical ferrule 3 in a forward direction. A pair of protrusions (member denoted by reference numeral 28 in FIGS. 2 and 3) formed on the front end faces of the pair of arm portions 21, and a pair of protrusions 29a formed to be opposed to the pair of protrusions 28 on the rear end face of the spring receiver 29 are inserted into the front and rear in the pair of coil springs 4', thereby preventing positional deviation of the coil spring 4'.

The operational effect of the spring pressing portion 5 in the optical connector 1' is the same as the case of the optical connector 1 of the first embodiment.

That is, when the optical connector 1 is assembled, the optical ferrule 3 is attached to the front end of the optical fibers in the state where the optical fibers previously pass through the inside of the rubber boot 9.

The end face of the optical ferrule 3 is grinded, and then the optical fibers (wire portion 8a) are covered with the spring pressing portion 5.

Also, in the optical connector 1', the spring pressing portion 5 is divided into two parts. Accordingly, at the time of assembly of the optical connector 1', the optical ferrule 3 is attached to the front end of the optical fibers and is terminated, and then the optical fibers can be covered with the spring pressing portion 5. Therefore, the terminating operation of the optical ferrule can be performed without the spring pressing portion that causes interference, and thus it is easy to perform the terminating operation of the optical ferrule.

In addition, the spring pressing portion 5 is divided into two half bodies 15. Accordingly, when the two half bodies 15 come into contact with each other by facing each other so as to cover the optical fibers and the coil spring 4, the spring pressing portion 5 is mounted on the optical fibers. At the time of contact, the engagement protrusion 26 of one half body 15 is inserted into the engagement hole 27 of the other half body 15 and thus both come into strong contact with each other. The contact operation by the engagement protrusion 26 and the engagement hole 27 is very easy and good in workability.

In the optical connector 1', it is not necessary to previously pass the optical fibers through the inside of the coil spring 4', and thus it is possible to prevent a decrease in workability caused by the coil spring 4'.

Next, the optical ferrule 3 is housed in the front portion in the connector housing 2. The pair of protrusions 28 formed on the front end faces of the arm portions 21 and the pair of protrusions 29a formed on the rear end face of the spring receiver 29 are inserted into the front and rear in the pair of coil springs 4', respectively.

The engagement claw 18 of the front end of the spring pressing portion 5 engages with the engagement hole 2a of the connector housing 2, and the protrusion portions 20a on both sides of the base portion 20 engage with the stair-shaped diameter expansion portion 2d of the connector housing 2, thereby attaching the spring pressing portion 5 to the rear portion of the connector housing 2. Next, the rubber boot attachment portion 22 of the rear portion of the spring pressing portion 5 is covered with the rubber boot 9. Consequently, the assembly of the optical connector 1' is completed.

The present invention is described above, but the present invention is not limited to the embodiments. While still within the scope of the concept of the present invention, addition, omission, replacement, or the other modification of the element may be performed. The invention is not limited to the above description, and is limited only by the scope of the attached claims.

For example, in the above-described embodiments, the two half bodies 15 constituting the spring pressing portion 5 are completely divided, but the two half bodies may have a hinge joint structure. As the hinge joint structure, there are many kinds of structures, and a thin hinge portion made of flexible resin may be used. It is appropriate that the resin of the thin hinge portion is more flexible than the half bodies, however, the same material can be used therefor.

The optical connector 1 in the above-described embodiment is applied to a so-called MPO connector that is a multi-core optical connector, but is not necessarily limited to the MPO connector and may be applied to the other type of multi-core optical connector.

In addition, the above-described technique is not limited to the multi-core connector, for example, and may be applied to a single-core connector such as an SC-type optical connector as described in JIS C5973. In short, the technique may be applied to an optical connector, in which an optical ferrule and a coli spring urging the optical ferrule in a forward direction are housed in a connector housing, having a structure to receive a reaction force using a spring pressing portion which is attached to a rear end side of the connector housing and has an optical fiber inserting through-hole and a spring reception portion.

What is claimed is:

1. An optical connector for a multi-core optical fiber comprising:
   a connector housing that houses an optical ferrule for a tape shaped optical fiber cord and a coil spring that impresses the optical ferrule in a forward direction; and
   a spring pressing portion that is attached to a rear end side of the connector housing and receives reaction force of the coil spring, and has an optical fiber inserting through-hole for passing only an optical fiber portion of the optical fiber cord therethrough without passing a coating portion of the optical fiber cord therethrough, and a spring reception portion;
   wherein the spring pressing portion includes a base portion in which a front end side thereof forms the spring reception portion, a pair of arm portions that extend forwardly from both sides of the optical fiber, and a boot attachment portion that is disposed at a rear side of the base portion so as to attach a boot on an outer circumference thereof;
   wherein inner portions of the base portion and the boot attachment portion form the optical fiber inserting through hole, and an inner diameter of the optical fiber inserting through hole in a thickness direction of the optical fiber cord is smaller than a thickness of the coating portion of the optical fiber cord;
   wherein an outer side surface of a front end portion of each of the arm portions and the connector housing are engageable with each other by engaging an engagement claw that is formed on the outer side surface of the front end portion of each of the arm portions with an engagement hole that is formed on the connector housing;
   wherein the spring pressing portion is composed of two half bodies that are obtained by dividing the base portion and the boot attachment portion at a center portion in a widthwise direction of the optical connector and the optical fiber inserting through-hole and the spring reception portion are formed when the half bodies have been assembled;
   wherein a pin clamp that holds guide pins that are used for an alignment of an opposite optical ferrule at the time of a face contact between two opposed optical ferrules, is attached to a rear end portion of the optical ferrule;
   wherein a flat face that faces the forward direction and a protrusion that projects to the forward direction from a center portion of the flat face are formed at the front end portion of each of the arm portions, a thicker portion in which a thickness in the widthwise direction of the connector is relatively thick is formed at the base portion side of each of the arm portions, and the flat face is formed at a front end of the thicker portion;
   wherein a thinner portion in which a thickness in the widthwise direction of the connector is relatively thin is formed at an outer side in the widthwise direction of the connector of the protrusion of each of the arm portions, and the engagement claw is formed on an outer side surface of the thinner portion; and
   wherein both of the protrusions of the arm portions are configured to prevent an excessive retreat of the optical ferrule by attaching the protrusions to a rear end of the pin clamp when the optical ferrule is excessively pressed by the opposite optical ferrule at the time of the face contact between two opposed optical ferrules.

2. The optical connector according to claim 1, wherein the spring pressing portion has a protrusion portion that engages with a stair-shaped diameter expansion portion of the connector housing.

3. The optical connector according to claim 2, wherein an engagement protrusion is formed on one junction face of the two half bodies, and an engagement recessed portion that engages with the engagement protrusion is formed on the other junction face of the two half bodies.

4. The optical connector according to claim 3, wherein the boot attachment portion is formed in a volute joint type by forming a plurality of circumferential grooves on the outer circumference of the boot attachment portion.

5. The optical connector according to claim 2, wherein the boot attachment portion is formed in a volute joint type by forming a plurality of circumferential grooves on the outer circumference of the boot attachment portion.

6. The optical connector according to claim 1, wherein an engagement protrusion is formed on one junction face of the two half bodies, and an engagement recessed portion that engages with the engagement protrusion is formed on the other junction face of the two half bodies.

7. The optical connector according to claim 6, wherein the boot attachment portion is formed in a volute joint type by forming a plurality of circumferential grooves on the outer circumference of the boot attachment portion.

8. The optical connector according to claim 1, wherein the boot attachment portion is formed in a volute joint type by forming a plurality of circumferential grooves on the outer circumference of the boot attachment portion.

\* \* \* \* \*